United States Patent [19]
Jones et al.

[11] 3,823,323
[45] July 9, 1974

[54] RADIATION DOSAGE MEASURING APPARATUS AND METHOD FOR THERMOLUMINESCENT DOSIMETERS

[75] Inventors: Alun R. Jones, Deep River, Ontario; Warren F. Richter, Petawawa, Onatrio, both of Canada

[73] Assignee: Atomic Energy of Canada Limited, Ottawa, Ontario, Canada

[22] Filed: Nov. 24, 1972

[21] Appl. No.: 309,526

[30] Foreign Application Priority Data
Jan. 7, 1972  Canada .................... 131908

[52] U.S. Cl. .............................. 250/484, 250/227
[51] Int. Cl. ........................................ G01t 1/11
[58] Field of Search ........ 250/71 R, 71.5 R, 83 CD, 250/484

[56] References Cited
UNITED STATES PATENTS
3,487,209  12/1969  Perry ............................ 250/71.5 R
3,590,245  6/1971  Donishi et al ..................... 250/71 R

*Primary Examiner*—James W. Lawrence
*Assistant Examiner*—Davis L. Willis
*Attorney, Agent, or Firm*—James R. Hughes

[57] ABSTRACT

An automatic reading device for thermoluminescent dosimeters wherein the TLD is placed over a heated surface with a thermocouple placed between the side of the TLD away from the heated surface and the end of a light-pipe leading to a photo-multiplier tube or other light measuring device. In this arrangement only the heat that flows from the heater through the TLD to the thermocouple is measured and used for control purpose.

5 Claims, 3 Drawing Figures

RADIATION DOSAGE MEASURING APPARATUS AND METHOD FOR THERMOLUMINESCENT DOSIMETERS

This invention relates to an automatic reading device for thermoluminescent dosimeters.

The thermoluminescent dosimeter (TLD) has become a standard defice for measuring amounts of ionizing radiation. These devices incorporate fluorescent substances that after exposure to ionizing or nuclear radiation and on heating to a particular temperature, emit the energy received from the radiation in the form of light. To obtain an effective and useful reading of the dosage of ionizing radiation it is most necessary to control the temperature of the TLD precisely.

It is therefore an object of the invention to provide a reader for thermoluminescent devices that precisely controls the temperature of the device and ensures accurate and complete reading.

This and other objects of the invention are achieved by a reader wherein the TLD is placed over a heated surface with a thermocouple placed between the side of the TLD away from the heated surface and the end of a light-pipe leading to a photo-multiplier tube or other light measuring device. In this arrangement only the heat that flows from the heater through the TLD to the thermocouple is measured and used for control purpose.

In drawings which illustrate an embodiment of the invention,

Figure 1:
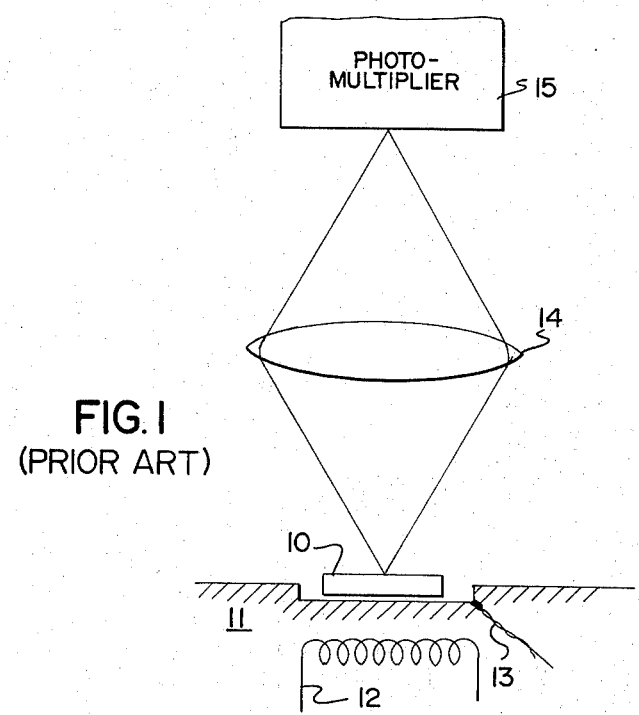
FIG. 1 shows the standard (prior art) method of reading TLD's.

Referring to FIG. 1 a standard reader is shown with the TLD disc, wafer, or powder 10 placed in a depression or recess in a planchet 11 which is primarily a thin metal strip, which is, itself, an electric heater 12 for heating the TLD. A thermocouple 13 is positioned in contact with the planchet to provide temperature information in regards to the TLD. On heating, the TLD emits energy in the form of light and this travels via a suitable lens system 14 to a light sensitive device such as a photomultiplier tube 15. The pulse of light received by the PMT is detected and measured in suitable electronic circuitry and is proportional to the dosage of radiation received by the TLD. The planchet is heated to a certain temperature, maintained there for a fixed period and then allowed to cool. The temperature is selected to be sufficient to empty all the electron traps in the fixed period and thus measure all the absorbed energy by integrating the light emitted. In the standard arrangement the TLD temperature is inferred from the planchet temperature. In fact there may be poor thermal contact between planchet and the TLD. In that event the TLD might not reach its proper temperature and a lower reading result without the operator being aware of anything wrong.

Figure 2:
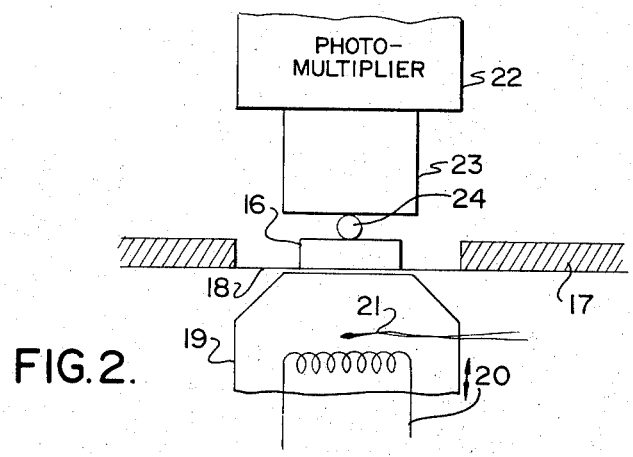
FIG. 2 shows a reader according to the invention.

A reader for TLD's that obviates these problems is shown in FIG. 2. In this arrangement the TLD 16 is placed in a recess in a suitable holder 17 and held in place on or by a high temperature adhesive tape 18. The holder might be in the form of a continuous strip with a series of recesses for TLD's passing through the reading station which would lend itself to automation. It has, however, been found more convenient to mount two TLD's on a single plaque. Each plaque has a hole code, which is read by the TLD reader (not shown), carrying the identity of the wearer. The TLD is positioned over a hot anvil 19 containing a heater 20 and a thermocouple 21. The anvil which is maintained at a temperature in excess of that needed is raised when a reading is to be taken to press against the TLD providing good thermal contact. The light emitted by the TLD passes to photomultiplier tube 22 via a light-pipe 23. A thermocouple 24 is placed between the TLD and the end of the light-pipe. This device monitors the top, cooler surface of the TLD. When this has reached the correct temperature the anvil is automatically dropped and the TLD removed. The thermocouple 24 cannot reach the correct temperature unless the TLD does so because the heat flow is through the TLD. The reader may be readily set up to automatically stop and provide an alarm if the process takes too long or is too short. This may be the result of poor thermal contact or even the absence of a TLD. This provides the operator with information on the situation.

Figure 3:
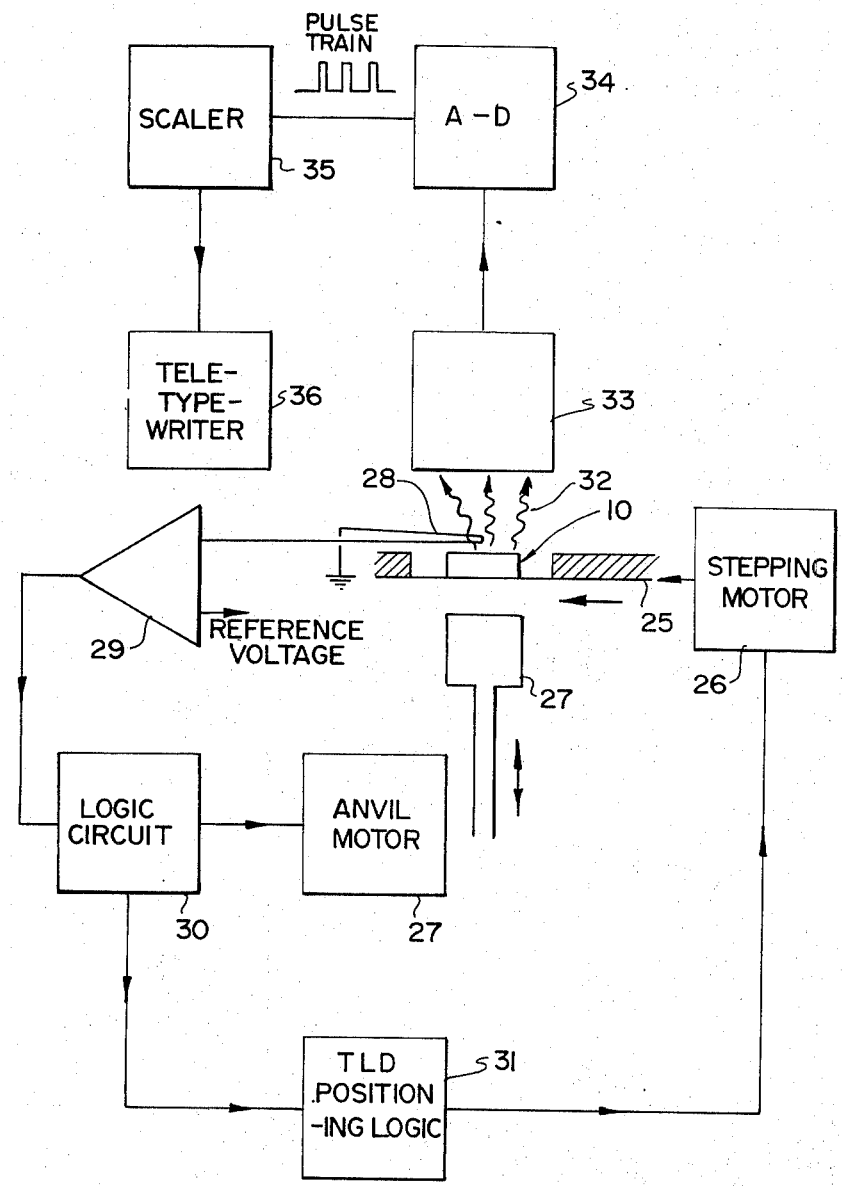
FIG. 3 is a circuit diagram of a typical control system for the heating and light receiving circuits.

FIG. 3 is a diagram of the basic operating and control circuitry. The TLD 10 positioned in plaque 25 which is arranged to be moved through the sensing station in predetermined steps by stepping motor 26. A hot anvil 27 is arranged to be raised under the TLD by anvil motor 27. A thermocouple 28 positioned above the TLD provides an output voltage that is compared with a reference in voltage comparator amplifier 29. An output is obtained that serves via logic circuit 30 and TLD positioning logic circuit 31 to sequentially operate the anvil and the stepping motor. The reference voltage is set at a level to ensure that the TLD reaches the temperature required for a complete reading. The light 32 emitted by the TLD passes preferably via a lightpipe (not shown) to photomultiplier 33 which gives an output current whose value is digitized in analog-to-digital converter. The resulting pulse train is counted in scaler 35 and an output may conveniently be provided to a teletypewriter 36.

The chief advantage of the apparatus and system described above is speed and certainty that the TLD has been heated to the correct temperature with no extra time required as a safety margin. This results in a fast, readily automated system that provides the necessary reading operation.

The embodiments of the invention in which an exclusive property or privilege is claimed are defined as follows:

1. A method of reading the amount of radiation dosage received by a thermoluminescent dosimeter comprising placing the thermoluminescent dosimeter over a heated surface which has been heated to a temperature greater than that required to empty all the electron traps in the thermoluminescent device in a fixed period, directly measuring the temperature of the thermoluminescent dosimeter adjacent a cooler surface away from the heated surface, measuring the light emitted by the thermoluminescent dosimeter, and removing the dosimeter from the vicinity of the heated surface when the measured temperature reaches a predetermined level, the integrated amount of said light emitted being related to the radiation dosage received by the dosimeter.

2. A method as in claim 1 wherein the emitted light is measured by placing a light-pipe between the emitting surface of the thermoluminescent dosimeter and a photomultiplier tube and the temperature is measured by means of a thermocouple placed between the thermoluminescent device and the end of the said light-pipe.

3. A reading device for thermoluminescent dosimeters comprising:
  a. heating means having a surface heated to a temperature greater than that required to empty all the electron traps in the thermoluminescent dosimeter in a fixed period,
  b. means for placing the dosimeter in thermal relation to the said surface so that the dosimeter will be heated,
  c. temperature sensing means positioned adjacent the sides of the dosimeter away from the heated surface,
  d. light measuring means,
  e. a light-pipe positioned to collect the light emitted by the dosimeter on heating and to convey it to the light measuring means, the amount of said light being related to the radiation dosage received by the said dosimeter, and
  f. means for removing the effect of said heated surface when the temperature sensing means reaches a predetermined temperature level.

4. A reading device as in claim 3 wherein the temperature sensing means is a thermocouple.

5. A reading device as in claim 3 wherein the light measuring means is a photo-multiplier tube.

* * * * *